United States Patent [19]

Jones

[11] Patent Number: 4,638,193
[45] Date of Patent: Jan. 20, 1987

[54] LINEAR IMPULSE MOTOR
[75] Inventor: J. Paul Jones, Glenmoore, Pa.
[73] Assignee: Med-Tech Associates, Broomall, Pa.
[21] Appl. No.: 674,185
[22] Filed: Nov. 23, 1984
[51] Int. Cl.$^4$ ............................................. H02K 33/00
[52] U.S. Cl. ......................................... 310/15; 310/30
[58] Field of Search ................................... 310/12–15, 310/30

[56] References Cited

U.S. PATENT DOCUMENTS 4,259,653  3/1981  McGonigal ....................... 310/30 X
4,334,748  6/1982  Stacklies et al. .................. 310/30 X
4,363,980 12/1982  Petersen ........................... 310/30 X Primary Examiner—Donovan F. Duggan
Attorney, Agent, or Firm—Frederick J. Olsson

[57] ABSTRACT

Method of creating a linear bi-directional impulse motor by employing a permanent magnet and U-shaped high permeability cores disposed and energized so that the respective poles of the cores and the poles of the magnet function and cooperate to move the magnet along an axis in one direction by a pulse applied to wire coils on the cores and to move the magnet in the opposite direction when the coils are de-energized.

1 Claim, 6 Drawing Figures

LINEAR IMPULSE MOTOR

This invention relates in general to permanent magnet motors and in particular relates to a method for creating a bi-directional impulse motor.

The invention employs a permanent magnet and U-shaped high permeability cores. According to the method these elements are disposed and energized so that the respective poles of the cores and the poles of the magnet function and cooperate to move the magnet along an axis in one direction by a pulse applied to wire coils on the cores and to move the magnet in the opposite direction when the coils are de-energized.

The motor of the invention finds special utility as a driving force for a miniature impulse pump incorporated in a low energy portable pump system. Such a pump is shown in my copending application filed concurrently herewith and entitled IMPROVED PUMP.

The following is a brief description of the drawings, in diagramatic form and which illustrates the method:

A linear impulse motor with special characteristics was needed for the above mentioned miniature impulse pump. These special requirements included:

1. The activation of drive impulses had to be very short in proportion to the interval between impulses, so that the average power requirements would be very low. (For example, a 1 ampere pulse for forty milliseconds, when spaced at a maximum rate of one per second, will only average 25 milliamps current).

2. The cylindrical shape of the shuttle of the pump would normally be easily adaptable to a common solenoid type magnetic coil which could surround the shuttle chamber, to react with the shuttle core magnet. However, it would not be possible to thread a drip chamber "spike" through a solenoid, before piercing the fluid container, because the passage would contaminate the spike, which could cause contamination of the intravenous fluid source.

3. To gain the most efficiency in driving the impulse motor, to allow miniaturization, something better than a solenoid coil was needed; so that a metal core could be used to concentrate the magnet field, for maximum interaction with the high flux density permanent core magnet.

The unique combination of core shapes and reactive permanent magnet and relative positions is explained below. This satisfies all of the requirements 1–3 mentioned above.

Figure 1:
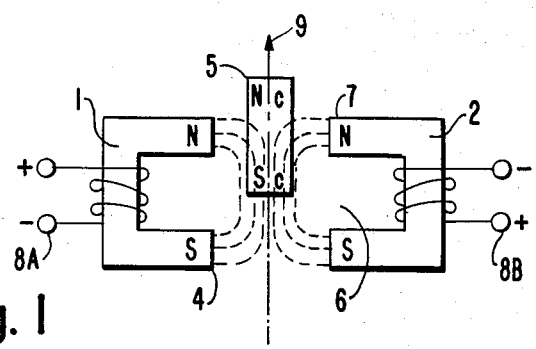
FIG. 1 illustrates the two cores and the permanent magnet and the configuration of the magnetic lines or flux created by the current through the coils around the two opposing U-shaped high permability cores.

With reference to FIG. 1, the configuration of the magnet lines caused by the two opposing U-shaped cores 1 and 2 of like polarity is shown. The magnetic lines 3, of the same polarity, eminating from the opposing core poles, would repel each other and, in so doing, allign themselves in a concentrated linear field that is parallel to the plane of the poles directed along the axis A. In the illustration the axis A is vertical.

A high flux density permanent magnet 5 which is essentially as long as the width of the core gap 6 plus the pole width 7 would be most reactive to the magnetic field cause by current in the windings 8A and 8B and the core pieces 1 and 2 when located, as shown, with one end at approximately the mid point of the core gaps 6. With the polarities shown, the permanent magnet 5 would be forced to move vertically as shown by the arrow 9.

Figure 2:
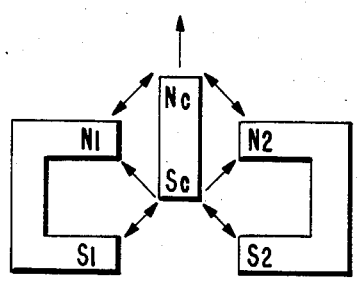
FIG. 2 illustrates the vector forces which provide the impulse drive, the permanent magnet being shown in the initial or start position, the vector forces all being in a direction such that the resultants cause upward motion of the magnet.

FIG. 2 is a simplified diagram of the vector forces involved in moving the permanent magnet core piece 5. It is important to note that all vector forces have their major vertical component in the same supporting direction—namely UP. Note that the south poles $S_1$ and $S_2$ of the cores are opposing the pole $S_c$ of the core magnet. Note also the north poles $N_1$ and $N_2$ of the cores are attracting to the south pole $S_c$ of the core magnet; and also opposing to the north pole $N_c$ of the core magnet 5. All of these vector forces have vertical components which are in the same direction; which is to drive the core magnet 5 upward.

The full sequence of impulse operation is shown in four steps with Figure diagrams 3, 4, 5, and 6.

Figure 3:
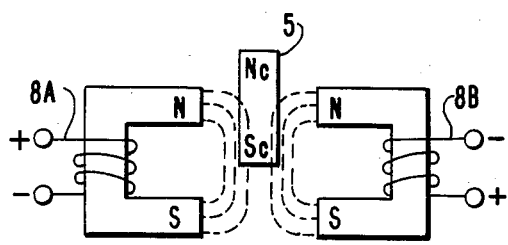
FIG. 3 illustrates the interacting polarities of the magnet and the magnetized cores at the start of the impulse.

FIG. 3 shows the position of the reactive core magnet 5 at the optimum position just below the center line of the core gap, at the start of the drive pulse through the coils 8A and 8B. This is termed a first position.

Figure 4:
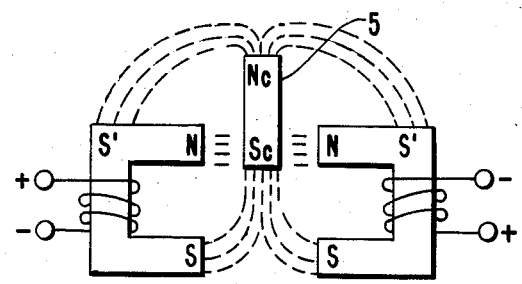
FIG. 4 illustrates polarity and flux paths at the end of the impulse with the magnet in its second position when the core drive current is still flowing.

FIG. 4 shows the position of the core piece 5 at the end of the impulse drive (or second position), and at the end of its motion; which is with the magnet pole $S_c$ essentially in allignment with the core poles $N_1$ and $N_2$.

Figure 5:
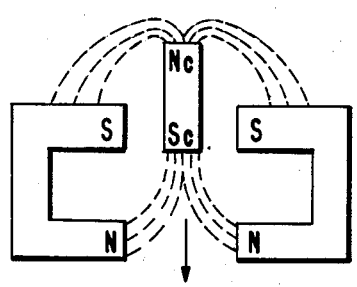
FIG. 5 illustrates the polarity and flux paths when the drive current has been removed and the magnetic polarity causes the permanent magnet to pull back to the first position by effectively using the undriven poles as a "shorting bar" for the flux path.
Figure 6:
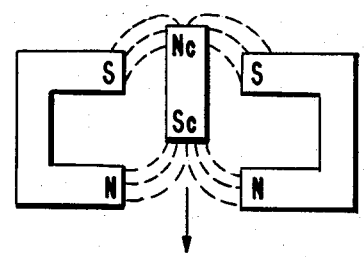
FIG. 6 illustrates the polarity and flux path when the permanent magnet has returned to the first position and the cores remain unenergized.

FIG. 5 shows the situation directly after the drive pulse has ended; and the pole pieces are no longer magnetized. In this state, the permanent core magnet 5 will immediately attempt to move downward to use both U-shaped cores as "shorting bars" for its own field. The end or first position is shown in FIG. 6—with the core magnet 5 still attempting to bridge the poles of the core pieces.

It will be understood that gravity plays some part in moving the core 5 from the second position down to the first position. The force causing the downward motion can be augmented by a spring, such as shown in my copending application. Further, it will be evident that various mechanical means are available for guiding the magnet 5 and that the first and second positions of the magnet are determined by mechanical stops (such as valve seats shown in my copending application). Lastly, it will be understood that the above impulse motion can be applied to the cores by providing for fixing the permanent magnet and providing for the cores to move in unison.

I claim:

1. The method of creating a linear impulse motor comprising the steps of:

providing a first C-shaped core and providing first coil means on the first core, the ends of the first core to periodically constitute respectively north and south poles when the first coil means is periodically energized to periodically establish a first magnetic field the flux path of which extends through the core and between said ends;

providing a second C-shaped core identical to the first core and providing second coil means on the second core the ends of the second core to periodically constitute respectively north and south poles when the second coil means is periodically energized simultaneously with said first coil means to establish a second magnetic field the flux path of which extends through the second core and between the ends thereof;

arranging the first and second cores so that when said magnetic fields are established said north poles of each are spaced apart and face one another and said south poles of each are spaced apart and face one another to provide a concentrated flux path extending between said opposing north and south poles;

providing an elongated permanent magnet the length of which is less than the outside length between said north and south poles but greater than one-half of said outside length and also providing for the permanent magnet to be movable back and forth along said concentrated flux path between a first position and a second position;

establishing said first position so that when the permanent magnet is in the first position the mid-section thereof is between said north poles of the first and second cores and the north pole of the permanent magnet is spaced outboard of said north poles of the first and second cores and the south pole of the permanent magnet is midway between said north and south poles of the first and second cores;

establishing said second position so that when the permanent magnet is in the second position the south pole thereof is between said north poles of the first and second cores and the north pole of the permanent magnet is spaced outboard of said north poles of the first and second cores a distance greater than first said spacing thereof; and periodically energizing said coils to cause the permanent magnet to move from said first to said second position and respectively after each said energizing deenergizing said coils to permit the permanent magnet to move from the second position to the first position by its own permanent magnetic force.

* * * * *